United States Patent
Finn et al.

(10) Patent No.: US 9,736,038 B2
(45) Date of Patent: *Aug. 15, 2017

(54) MANAGING CHANGE IN AN INFORMATION TECHNOLOGY ENVIRONMENT

(71) Applicant: International Business Machines Corporation, Armonk, NY (US)

(72) Inventors: Peter G. Finn, Markham (CA); Manvendra Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,865

(22) Filed: Jan. 20, 2017

(65) Prior Publication Data

US 2017/0126514 A1 May 4, 2017

Related U.S. Application Data

(63) Continuation of application No. 15/064,675, filed on Mar. 9, 2016, now Pat. No. 9,614,738, which is a
(Continued)

(51) Int. Cl.
| | |
|---|---|
| G06F 15/16 | (2006.01) |
| H04L 12/24 | (2006.01) |
| G06F 9/445 | (2006.01) |

(52) U.S. Cl.
CPC ...... H04L 41/5074 (2013.01); G06F 9/44505 (2013.01); H04L 41/22 (2013.01)

(58) Field of Classification Search
CPC ............ B29C 47/6018; B29C 47/6025; G06F 21/6218; G06F 8/70; G06F 9/44505; G06Q 10/00; H04L 41/5074
(Continued)

(56) References Cited

U.S. PATENT DOCUMENTS

| | | |
|---|---|---|
| 6,938,081 B1 | 8/2005 | Mir |
| 7,496,912 B2 | 2/2009 | Keller et al. |

(Continued)

OTHER PUBLICATIONS

"HP Matrix Operating Environment for a Converged Infrastructure", Jun. 2010, <http://h18000.www1.hp.com/products/solutions/converged/ioe-raa1-rr09enw.pdf>.
(Continued)

*Primary Examiner* — Ario Etienne
*Assistant Examiner* — Thorne E Waugh
(74) *Attorney, Agent, or Firm* — Daniel R. Simek

(57) ABSTRACT

In a method for managing change in an information technology (IT) environment, in response to an open change ticket, identifying one or more components of the IT environment that are associated with at least one change operation included in the change ticket. The method further includes identifying information associated with the identified one or more components of the IT environment. The method further includes determining a listing of allowable change operations for the identified one or more components of the IT environment in the change ticket based on the identified information associated with the identified one or more components of the IT environment. The method further includes receiving a user requested change operation. The method further includes determining whether the received user requested change operation is included in the determined listing of allowable change operations.

1 Claim, 3 Drawing Sheets

Related U.S. Application Data continuation of application No. 14/314,070, filed on Jun. 25, 2014, now Pat. No. 9,548,907.

(58) Field of Classification Search
USPC .................................................. 709/203–230
See application file for complete search history.

(56) References Cited

U.S. PATENT DOCUMENTS

| | | | |
|---|---|---|---|
| 7,818,283 B1* | 10/2010 | Bajpay | H04L 12/2856 707/E17.005 |
| 8,156,063 B1 | 4/2012 | Rahmouni et al. | |
| 8,417,996 B2 | 4/2013 | Anand et al. | |
| 8,543,443 B2 | 9/2013 | Keane et al. | |
| 8,738,760 B2* | 5/2014 | Adams, Jr. | H04L 12/2697 709/223 |
| 8,812,649 B2* | 8/2014 | Adams, Jr. | H04L 12/2697 709/224 |
| 8,819,763 B1* | 8/2014 | Cheung | H04L 63/10 726/1 |
| 8,954,311 B2 | 2/2015 | Gupta et al. | |
| 2007/0136242 A1 | 6/2007 | Auvenshine et al. | |
| 2008/0281833 A1 | 11/2008 | Cain et al. | |
| 2009/0150887 A1 | 6/2009 | Sanghvi et al. | |
| 2010/0251247 A1 | 9/2010 | Pedersen | |
| 2010/0318391 A1 | 12/2010 | Gvirtsman et al. | |
| 2011/0099158 A1 | 4/2011 | Magnuson et al. | |
| 2013/0054601 A1 | 2/2013 | Whitlock et al. | |
| 2013/0254768 A1 | 9/2013 | Wipfel et al. | |
| 2014/0053145 A1 | 2/2014 | Steigleder | |
| 2014/0143769 A1 | 5/2014 | Nigul | |

OTHER PUBLICATIONS

List of IBM Patents or Patent Applications Treated as Related, Appendix P, Filed Herewith, 2 pages.

Finn, et al., "Managing Change in an Information Technology Environment", U.S. Appl. No. 15/377,321, filed Dec. 13, 2016.

Finn, et al., "Managing Change in an Information Technology Environment", U.S. Appl. No. 14/314,070, filed Jun. 25, 2014.

Finn, et al., "Managing Change in an Information Technology Environment", U.S. Appl. No. 15/064,675, filed Mar. 9, 2016.

Finn, et al., "Managing Change in an Information Technology Environment", U.S. Appl. No. 15/410,876, filed Jan. 20, 2017.

* cited by examiner

MANAGING CHANGE IN AN INFORMATION TECHNOLOGY ENVIRONMENT

BACKGROUND OF THE INVENTION

The present invention relates generally to the field of Information Technology (IT) environments, and more particularly to managing change in an IT environment.

An IT environment, or IT infrastructure, includes a variety of IT resources, which are managed, in accordance with the needs and priorities of an organization. Some examples of resources that an IT environment can include are computer hardware, computer software, networks, data, and data centers. An IT infrastructure is a combined set of hardware, software, networks, facilities, etc. (including all of the information technology), in order to develop, test, deliver, monitor, control, or support IT services.

A converged IT infrastructure packages multiple IT components and resources into a single, optimized computing solution. Components of a converged IT infrastructure solution include servers, data storage devices, networking equipment and software for IT infrastructure management, automation, and orchestration. Converged IT infrastructure is used by IT organizations to centralize the management of IT resources, consolidate systems, increase resource utilization rates, and lower costs. These objectives are enabled by the creation of pools of computers, storage, and networking resources that can be shared by multiple applications and managed in a collective manner using policy driven processes.

Change management in an IT environment, or a converged IT infrastructure, is accomplished utilizing change tickets. A change ticket includes modifications (i.e., change operations) to one or more system areas of the IT environment and specifies the system areas that are to be modified. The system areas include the components and sub-components of the IT environment. Some examples of change operations include replacing a file, updating software (e.g., a software patch), and modifying virtual machine resources in one or more components of an IT environment.

SUMMARY

Aspects of the present invention disclose a method, computer program product, service, and system for managing change in an information technology (IT) environment. The method includes one or more processors in response to an open change ticket, identifying one or more components of the IT environment that are associated with at least one change operation included in the change ticket. The method further includes one or more processors identifying information associated with the identified one or more components of the IT environment. The method further includes one or more processors determining a listing of allowable change operations for the identified one or more components of the IT environment in the change ticket based on the identified information associated with the identified one or more components of the IT environment. The method further includes one or more processors receiving a user requested change operation. The method further includes one or more processors determining whether the received user requested change operation is included in the determined listing of allowable change operations.

DETAILED DESCRIPTION

Embodiments of the present invention allow for management of change operations on components of an Information Technology (IT) environment. In one embodiment, in response to opening a change ticket, components of the IT environment that will be affected are identified. Then, an operator is capable of performing change operations, in accordance with the change ticket, on the identified components of the IT environment indicated by the change ticket.

Some embodiments of the present invention recognize that an IT environment, or a converged IT infrastructure, can include a variety of different components that may relate to different areas of an organization. An operator that performs change management operations in the IT environment can have a general knowledge in the different area of an organization and may not have, or need, a deep knowledge in the subject areas corresponding to the different areas of the organization. In the IT environment, change operations and change tickets are created for potentially all areas of the IT environment, even the subject areas that are not in the expertise area of the operator.

Figure 1:
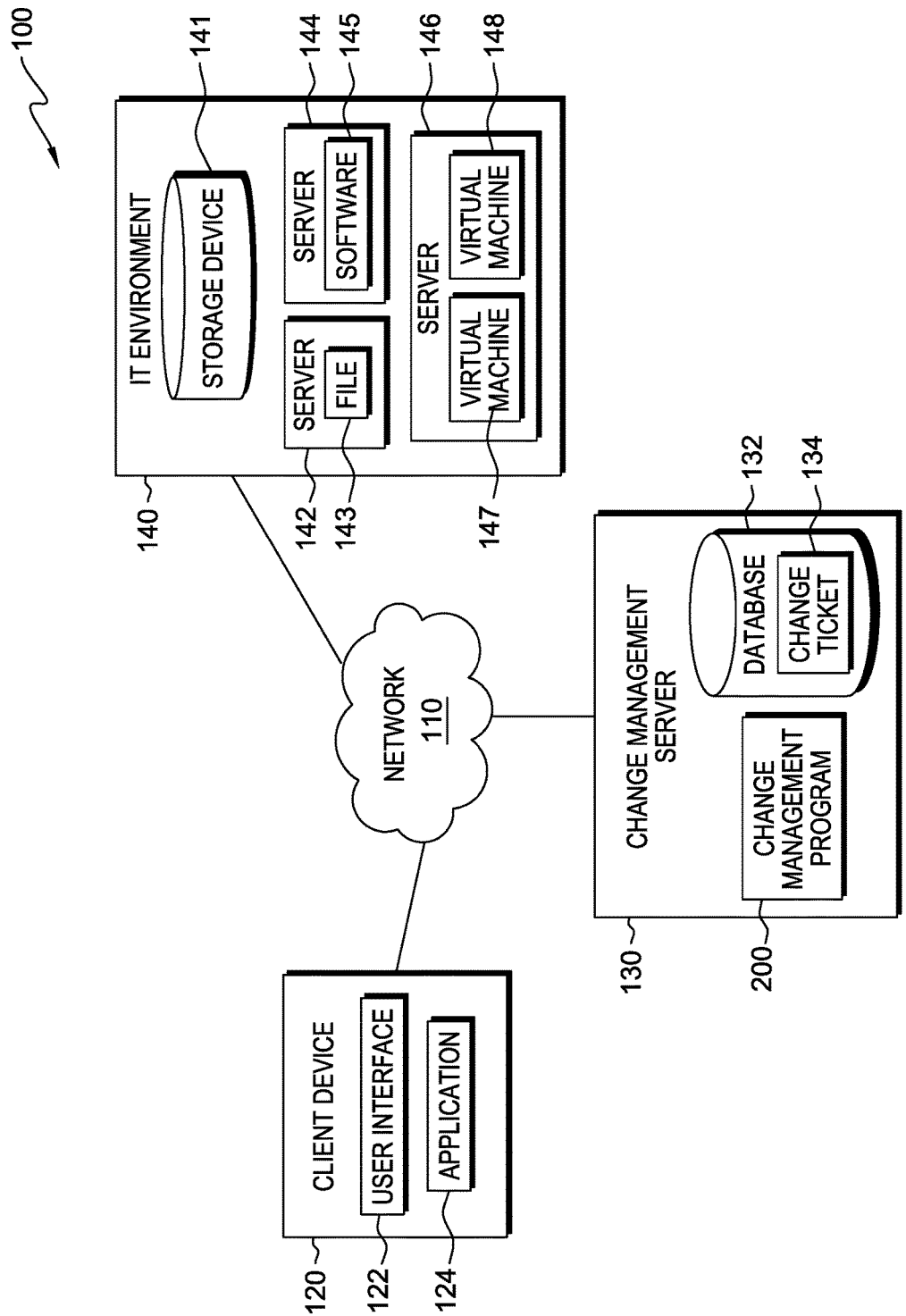
FIG. 1 is a functional block diagram of a data processing environment, in accordance with an embodiment of the present invention.

The present invention will now be described in detail with reference to the Figures. FIG. 1 is a functional block diagram illustrating data processing environment 100, in accordance with one embodiment of the present invention.

An embodiment of data processing environment 100 includes client device 120, change management server 130, and IT environment 140, all interconnected over network 110. In one embodiment, client device 120, change management server 130, and IT environment 140 communicate through network 110. Network 110 can be, for example, a local area network (LAN), a telecommunications network, a wide area network (WAN) such as the Internet, or a combination of the three, and include wired, wireless, or fiber optic connections. In general, network 110 can be any combination of connections and protocols that will support communications between client device 120, change management server 130, and IT environment 140, in accordance with embodiments of the present invention. Still yet, any of the components of the present invention could be deployed, managed, serviced, etc. by a service provider who offers change management.

In an example embodiment, client device 120 can access and interact with data and components of change management server 130 and IT environment 140, via network 110. In another embodiment, client device 120 utilizes change management server 130 to access IT environment 140 and perform change operations on components of IT environment 140. For example, client device 120 can be a remote terminal or a desktop computer that an operator of IT environment 140 can utilize manage potential changes (e.g., change ticket 134) to IT environment 140. In various embodiments of the present invention, client device 120 may be a workstation, personal computer, personal digital assistant, mobile phone, or any other device capable of executing program instructions, in accordance with embodiments of the present invention. In general, client device 120 is representative of any electronic device or combination of electronic devices capable of executing machine-readable program instructions, as described in greater detail with regard to FIG. 3, in accordance with embodiments of the present invention.

Client device 120 includes user interface 122 and application 124. User interface 122 is a program that provides an interface between a user of client device 120 and a plurality of applications that reside on the server computer (not shown). A user interface, such as user interface 122, refers to the information (such as graphic, text, and sound) that a program presents to a user and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements.

In various embodiments, application 124 is any type of software application that a user of client device 120 can utilize to access change management server 130 (e.g., change management program 200 and database 132 on change management server 130). For example, application 124 is a change management application that an operator of IT environment 140 can utilize access change management server 130 to manage potential changes to IT environment 140 (e.g., via use of user interface 122 on client device 120).

In example embodiments, change management server 130 can be a desktop computer, a computer server, or any other computer system known in the art. In certain embodiments, change management server 130 represents computer systems utilizing clustered computers and components (e.g., database server computers, application server computers, etc.) that act as a single pool of seamless resources when accessed by elements of data processing environment 100 (e.g., client device 120). In general, change management server 130 is representative of any electronic device or combination of electronic devices capable of executing machine-readable program instructions, as described in greater detail with regard to FIG. 3, in accordance with embodiments of the present invention.

In one embodiment, change management server 130 facilitates change operations on components of IT environment 140 from an operator associated with IT environment 140 (e.g., an individual utilizing client device 120). Change management server 130 includes change management program 200 and database 132, which includes change ticket 134. In example embodiments, change management program 200 manages change operations for components of IT environment 140, in accordance with embodiments of the present invention. In another embodiment, change management program 200 can be located on client device 120. Database 132 can be implemented with any type of storage device, for example, persistent storage 308, which is capable of storing data that may be accessed and utilized by client device 120 and change management server 130, such as a database server, a hard disk drive, or a flash memory. In other embodiments, database 132 can represent multiple storage devices within change management server 130.

Database 132 stores a plurality of instances of change ticket 134 and information associated with change operations in IT environment 140 (e.g., log files associated with IT environment 140, error messages, administrative commands, etc.). In one embodiment, database 132 includes historical records of previous changes to components of IT environment 140 (e.g., previous change operations and change tickets). In another embodiment, database 132 includes best practices data associated with IT environment 140. In yet another embodiment, database 132 includes listings of allowable operations that users are capable of performing on IT environment 140 (e.g., changing a directory, viewing a process listing, steps for authentication, etc.).

Change ticket 134 includes one or more change operations that are intended for components of IT environment 140 and includes indications of the components of IT environment 140 corresponding to the one or more change operations (e.g., server 142, software 145 on server 144, virtual machine 147 on server 146, storage device 141, etc.). For example, change ticket 134 includes a software patch for software 145 on server 144 of IT environment 140, along with an indication that the software patch is intended to update software 145 on server 144.

Change management server 130 is capable of determining and providing (e.g., to client device 120) a listing of components of IT environment 140. In one embodiment, database 132 includes a listing of all of the components of IT environment 140 (e.g., storage device 141 and servers 142, 144, and 146) and sub-components of IT environment 140. In another embodiment, change management server 130 can utilize administration manuals associated with components of IT environment 140, log files, and database messages associated with components of IT environment 140 and a mapping of sections of IT environment 140 to determine a listing of the components and sub-components of IT environment 140. In an example embodiment, change management server 130 can parse (e.g., via Natural Language Processing) text manuals associated with components of IT environment 140 to determine a listing of the components and sub-components of IT environment 140.

In one embodiment, IT environment 140 is a converged IT infrastructure, which includes a plurality of components and resources. Components and resources of IT environment 140 include storage device 141, servers 142, 144, and 146, as well as additional components and resources (e.g., additional servers, data storage devices, networking equipment, and software that are not shown).

In example embodiments, servers 142, 144, and 146 can be desktop computers, computer servers, or any other computer systems known in the art. In certain embodiments, servers 142, 144, and 146 represent computer systems utilizing clustered computers and components (e.g., database server computers, application server computers, etc.) that act as a single pool of seamless resources when accessed by elements of data processing environment 100 (e.g., client device 120, change management server 130, and components of IT environment 140). In general, servers 142, 144, and 146 are representative of any electronic device or combination of electronic devices capable of executing machine-readable program instructions, as described in greater detail with regard to FIG. 3, in accordance with embodiments of the present invention. Storage device 141 can be implemented with any type of storage device, for example, persistent storage 308, which is capable of storing data that may be accessed and utilized by client device 120, change management server 130, and components of IT environment 140, such as a database server, a hard disk drive, or a flash memory. In other embodiments, storage device 141 can represent multiple storage devices within IT environment 140.

Server 142 includes file 143. In various embodiments, file 143 is an instance of data that is stored on server 142. In an example embodiment, change ticket 134 includes a change operation to replace file 143 on server 142 with an updated file. Server 144 includes software 145. In various embodiments, software 145 is an instance of software, or a suite of software applications, that is stored on server 144. In an example embodiment, change ticket 134 includes a change operation to update software 145 with a software patch. Server 146 includes virtual machines 147 and 148. In various embodiments, virtual machines 147 and 148 are software implementations of computing systems that utilize computer resources of server 146 (e.g., computer memory, software licenses, applications, central processing units (CPUs), network ports, operating systems, and disk space). In an example embodiment, change ticket 134 includes a change operation to allocate an additional network port resource of server 146 to virtual machine 147.

Figure 2:
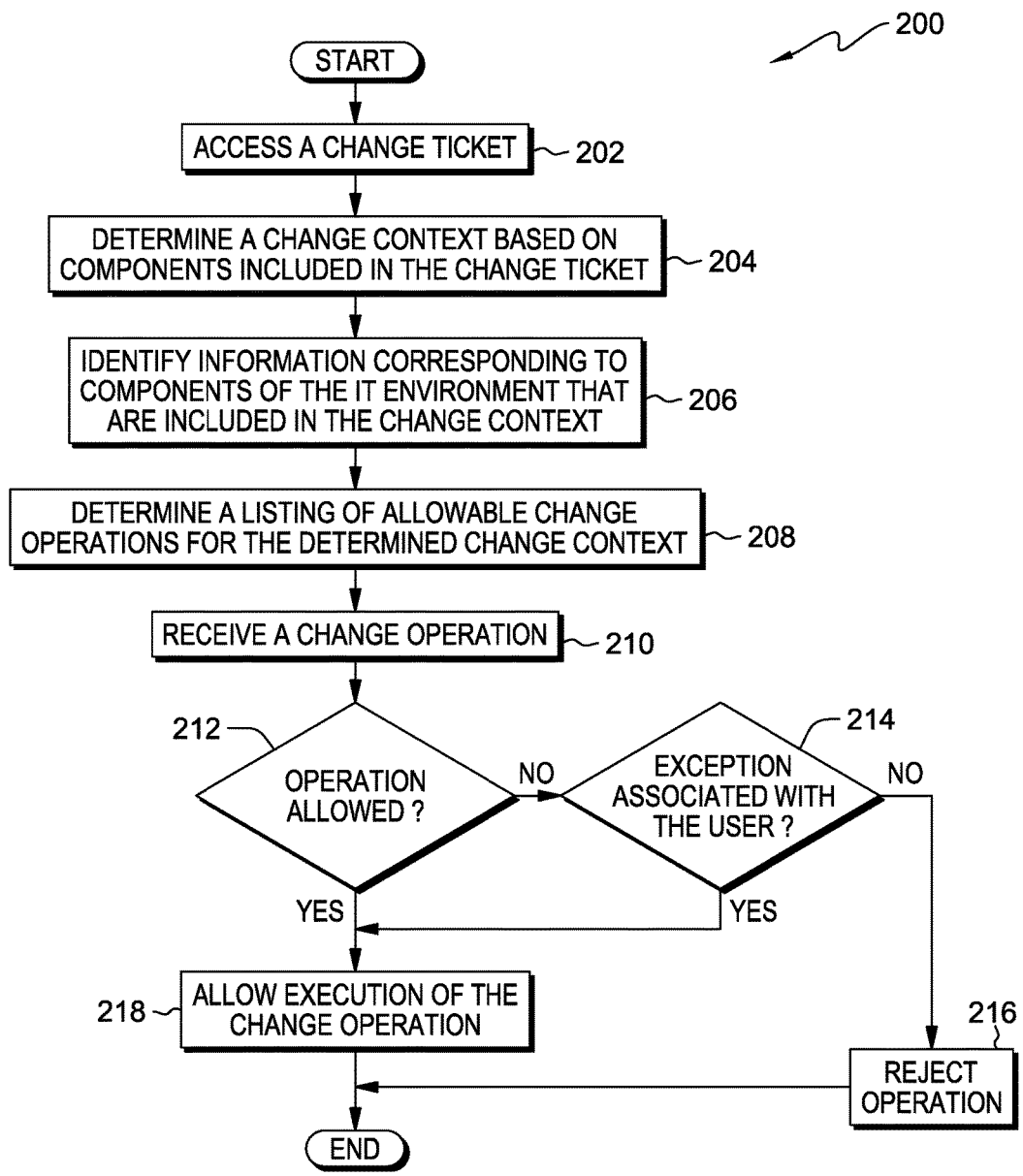
FIG. 2 is a flowchart depicting operational steps of a program for management of change operations on components of an Information Technology (IT) environment, in accordance with an embodiment of the present invention.

FIG. 2 is a flowchart depicting operational steps of change management program 200, in accordance with an embodiment of the present invention. Change management program 200 operates on change management server 130 to manage change operations that a user of client device 120 can perform on components of IT environment 140. In one embodiment, change management program 200 initiates in response to receiving a request to access a change ticket (e.g., open and view change ticket 134) in database 132.

In step 202, change management program 200 accesses a change ticket. In one embodiment, in response to a user of client device 120 (e.g., an operator associated with IT environment 140) accessing change ticket 134, change management program 200 accesses change ticket 134 in database 132. In various embodiments, change management program 200 accesses change ticket 134, which includes at least one change operation that is intended for one or more components of IT environment 140 and an indication of the components of IT environment 140 corresponding to the at least one change operation. In an example embodiment, change ticket 134 includes a change operation to update software 145 on server 144 with a software patch.

In step 204, change management program 200 determines a change context based on components included in the change ticket. In one embodiment, the change context is an indication of the components of IT environment 140 that change ticket 134 includes change operations to modify. In various embodiments, the change context can provide an indication of a specific component of IT environment 140 (e.g., file 143 on server 142) or an area of IT environment that can include multiple components (e.g., servers of IT environment 140, which includes servers 142, 144, and 146). For example, if change ticket 134 includes a change operation to update software 145 on server 144 with a software patch, then change management program 200 determines a change context that includes software 145 on server 144. In one embodiment, change management program 200 determines a change context by identifying one or more components of IT environment 140 that are associated with change operations that are included in change ticket 134.

In step 206, change management program 200 identifies information corresponding to components of the IT environment that are included in the change context. In one embodiment, change management program 200 utilizes the determined change context (determined in step 204) to look up and identify information that corresponds to the one or more components of IT environment 140 includes in the change context. In example embodiments, change management program 200 accesses data that is stored in database 132, which includes information associated with change operations in IT environment 140 (e.g., log files associated with IT environment 140, error messages, administrative commands, etc.).

In one embodiment, for each component of IT environment 140 that is included in the determined change context, change management program 200 identified information associated with the component, which is stored in database 132. In an example embodiment, change management program 200 identifies historical records of previous changes to components of IT environment 140. For example, change management program 200 identifies historical records of previous change operations on server 144 and software 145, which can provide an indication of change operations that are allowed on server 144 and software 145. In another example embodiment, change management program 200 identifies best practices data associated with IT environment 140. For example, change management program 200 best practices information that corresponds to server 144 and software 145, which can provide an indication of change operations that are allowed on server 144 and software 145. In yet another example embodiment, change management program 200 identifies listings of allowable operations that users are capable of performing on IT environment 140. For example, change management program 200 can identify a change directory, a process listing, and authentication steps that correspond to server 144 and software 145, which can provide an indication of change operations that are allowed on server 144 and software 145. In additional embodiments, change management program 200 can identify additional information in database 132 that can provide an indication of change operations that are allowed on components or system areas of IT environment 140.

In step 208, change management program 200 determines a listing of allowable change operations for the determined change context. In one embodiment, change management program 200 utilizes identified information corresponding to components of the IT environment that are included in the change context (identified in step 206) to determine a listing of allowable change operations for the determined change context and change ticket 134. In various embodiments, change management program 200 utilizes identified information that includes historical records of previous changes to components of IT environment 140, best practices data associated with IT environment 140, and listings of allowable operations that users are capable of performing on IT environment 140. For example, identified historical records of previous changes to server 144 and software 145 includes information that indicates that modifying software 145, via a software update, is an operation that has previously occurred successfully. In this example, change management program 200 determines that modifying software 145 on server 144, via a software update, is included in the listing of allowable actions.

In step 210, change management program 200 receives a change operation. In one embodiment, change management program 200 receives a change operation from client device 120 (e.g., through a selection via user interface 122 from an operator of IT environment 140). In an example embodiment, a user of client device 120 executes one of the one or more change operations included in change ticket 134 and change management server 130, via change management program 200, and intercepts the change operation.

In an example, a user of client device 120 is an operator of IT environment 140 utilizing client device 120 as a remote terminal to access IT environment 140 and selects a change operation in change ticket 134 to update software 145 on server 144 with a software patch. Change management server 130 intercepts the selected change operation, and change management program 200 receives the selected change operation.

In step 212, change management program 200 determines whether the received change operation is an allowable change operation. In one embodiment, change management program 200 compares the received change operation (received in step 210) to the determined listing of allowable change operations for the determined change context (determined in step 208) to determine whether the received change operation is included in the determined listing of allowable change operations. If the received change operation is not included in the determined listing of allowable change operations, then change management program 200 determines that the received change operation is not an allowable change operation. If the received change operation is included in the determined listing of allowable change operations, then change management program 200 determines that the received change operation is an allowable change operation.

In step 214, change management program 200 determines whether an exception is associated with the user. More specifically, responsive to determining that the received change operation is not an allowable change operation (decision step 212, "no" branch), change management program 200 determines whether the user that selected the received change operation (received in step 210) is associated with an exception that allows execution of any change operation. In one embodiment, change management program 200 determines whether the user profile of the user that selected the change operation is a superuser account (e.g., an administrator, supervisor, root account, etc.). In example embodiments, the exception associated with the user profile is an authorization flag that indicated that the user is capable of performing administrative functions and additional privileges. It the user profile is a superuser account, then change management program 200 determines that an exception is associated with the user. If the user profile is not a superuser account, then change management program 200 determines that an exception is not associated with the user.

In step 216, change management program 200 rejects the change operation. More specifically, responsive to determining that an exception is not associated with the user (decision step 214, "no" branch), change management program 200 rejects the change operation (received in step 210). In one embodiment, change management program 200 saves the rejected change operation in database 132 as an indication of a non-allowable change operation associated with IT environment 140. In another embodiment, responsive to determining that an exception is not associated with the user, change management program 200 can allow the change operation and issue a system management alert that the change operation is not included in the determined listing of allowable change operations (determined in step 212). In an example embodiment, the alert can provide information including details of change ticket 134, a user profile of the user that executed the change operation, and the command being executed.

In step 218, change management program 200 allows execution of the change operation. In one embodiment, responsive to determining that the received change operation is an allowable change operation (decision step 212, "yes" branch), change management program 200 allows execution of the change operation. In another embodiment, responsive to determining that an exception is associated with the user (decision step 214, "yes" branch), change management program 200 allows execution of the change operation. In response to allowing the change operation, change management program 200 saves the allowed change operation in database 132 as an indication of an allowable change operation associated with IT environment 140. In an example embodiment, responsive to determining that the received change operation (in change ticket 134) to update software 145 on server 144 with a software patch is an allowable change operation (decision step 212, "yes" branch), change management program 200 updates software 145 with the software patch included in change ticket 134. Additionally, change management program 200 saves change operation of updating software 145 on server 144 with an software update in database 132 as an indication of an allowable change operation associated with IT environment 140, server 144, and software 145.

In another embodiment, the invention provides a business method that performs the process steps of the invention on a subscription, advertising, and/or fee basis. That is, a service provider, such as a Solution Integrator, could offer change management. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Figure 3:
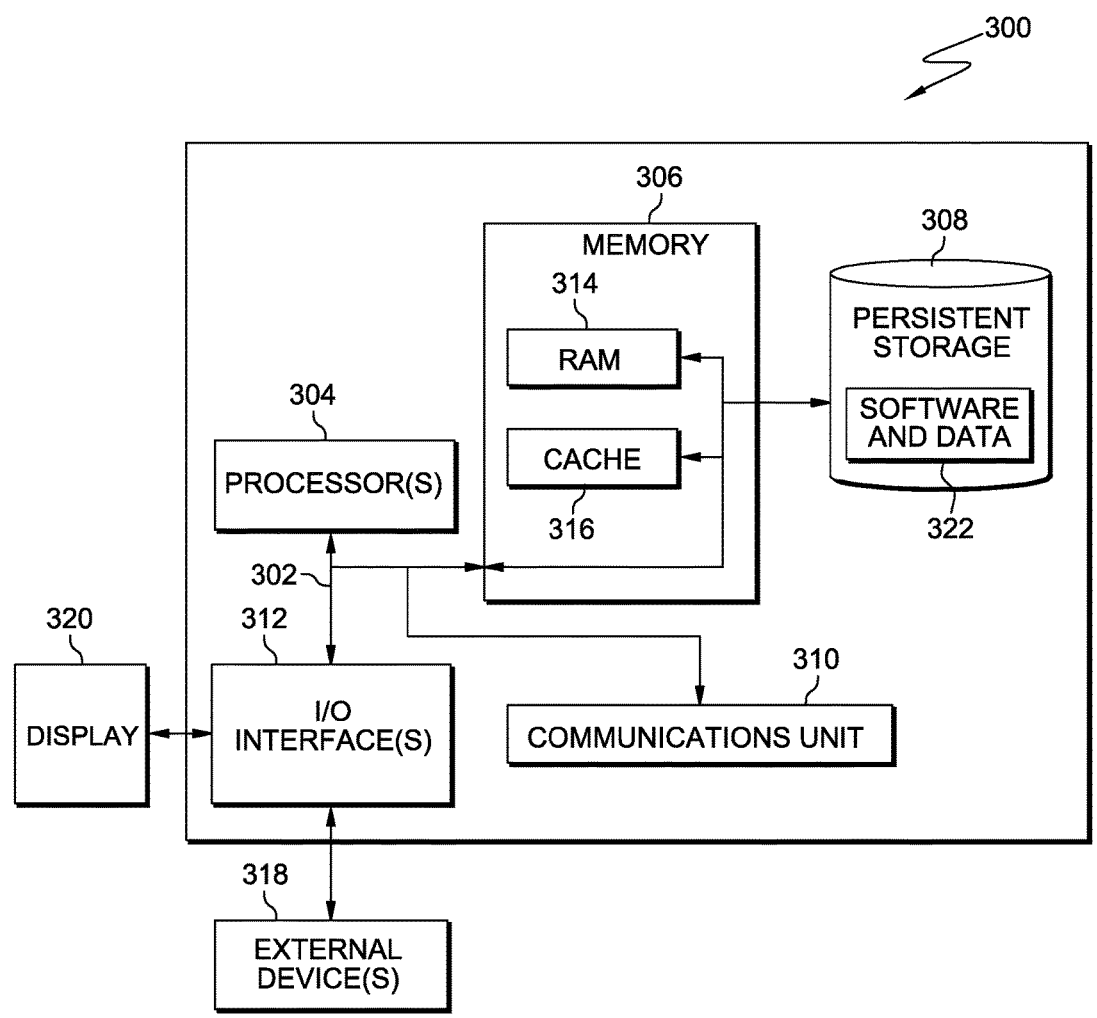
FIG. 3 depicts a block diagram of components of a computing system representative of the client device, change management server, and servers of FIG. 1, in accordance with an embodiment of the present invention.

FIG. 3 depicts a block diagram of components of computer 300, which is representative of client device 120, change management server 130, and servers 142, 144, and 146, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are examples of computer readable tangible storage devices. A storage device is any piece of hardware that is capable of storing information, such as, data, program code in functional form, and/or other suitable information on a temporary basis and/or permanent basis. In this embodiment, memory 306 includes random access memory (RAM) 314 and cache memory 316. In general, memory 306 can include any suitable volatile or non-volatile computer readable storage device. Software and data 322 are stored in persistent storage 308 for access and/or execution by processors 304 via one or more memories of memory 306. With respect to client device 120, software and data 322 includes application 124. With respect to change management server 130, software and data 322 includes change management program 200 and change ticket 134. With respect to server 142, software and data 322 includes file 143. With respect to server 144, software and data 322 includes software 145. With respect to server 146, software and data 322 includes virtual machines 147 and 148.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, a service, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing change in an information technology (IT) environment, the computer program product comprising:
   one or more computer readable storage media and program instructions stored on the one or more computer readable storage media, the program instructions comprising:
   program instructions to identify information associated with an identified one or more components of the IT environment;
   in response to an open change ticket, program instructions to identify one or more components of the IT environment that are associated with at least one change operation included in the open change ticket, wherein the identified information associated with the identified one or more components of the IT environment includes one or more of: historical records of previous changes to components of the IT environment, best practices information associated with the IT environment, and indications of allowable change operations for a user in the IT environment;
   program instructions to determine a listing of allowable change operations for the identified one or more components of the IT environment and in the open change ticket based on the identified information associated with the identified one or more components of the IT environment;
   program instructions to receive a user requested change operation, wherein receiving the user requested change operation includes intercepting the user requested change operation;
   program instructions to determine whether the received user requested change operation is included in the determined listing of allowable change operations;
   responsive to determining that the received user requested change operation is included in the determined listing of allowable change operations, program instructions to execute the user requested change operation;
   responsive to determining that the received user requested change operation is not included in the determined listing of allowable change operations, program instructions to determine whether an exception is associated with the user that requested the change operation;
   responsive to determining that an exception is associated with the user that requested the change operation, program instructions to execute the user requested change operation;
   responsive to determining that an exception is not associated with the user that
   requested the change operation, program instructions to rejecting the user requested change operation; and
   program instructions to store the executed user requested change operation as one of the allowable change operations of the listing of allowable change operations associated with the IT environment.

* * * * *